(No Model.) 4 Sheets—Sheet 1.
C. C. HIGHAM.
TRUCK BRAKE.

No. 492,923. Patented Mar. 7, 1893.

Witnesses:
F. R. Cornwall
D. Darley.

Inventor,
Charles C. Higham
by F. W. Ritter Jr.
Atty (No Model.) 4 Sheets—Sheet 2.
C. C. HIGHAM.
TRUCK BRAKE.
No. 492,923. Patented Mar. 7, 1893.
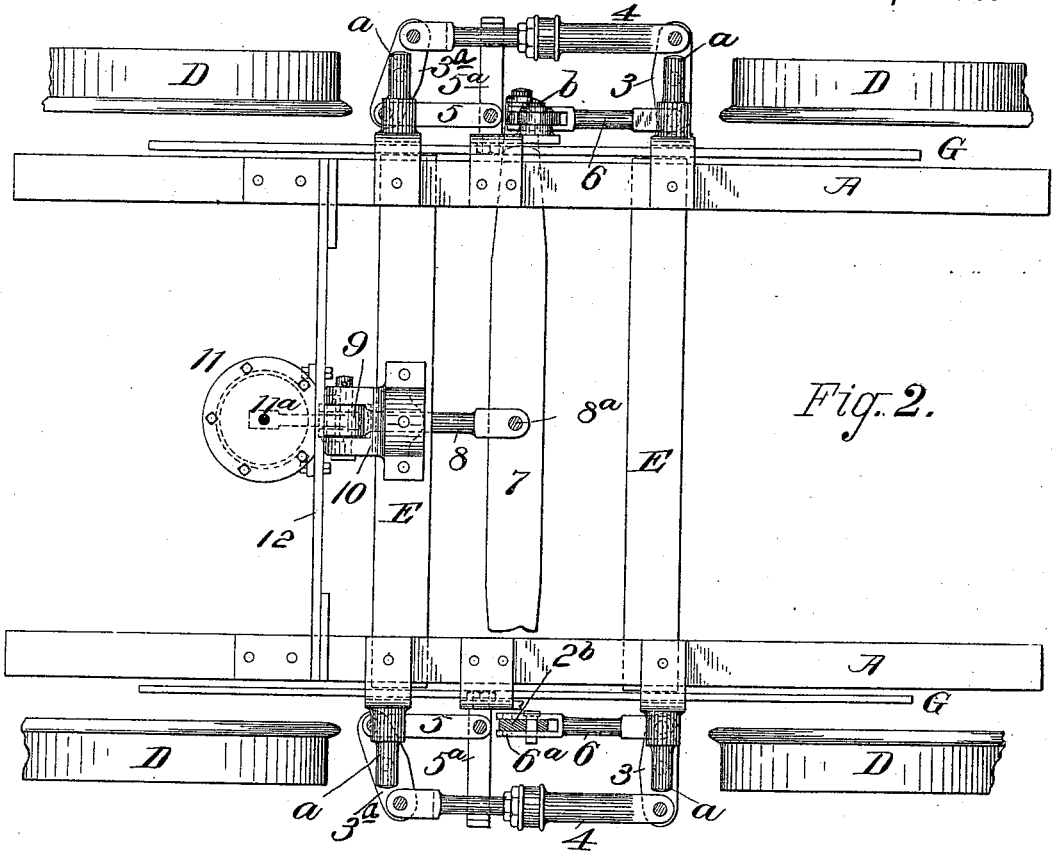
Fig. 2.
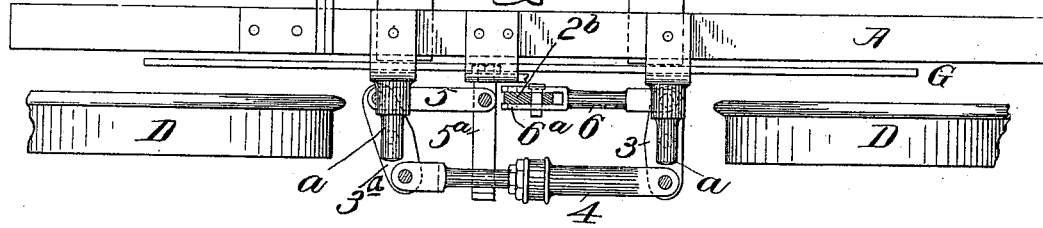
Fig. 3.
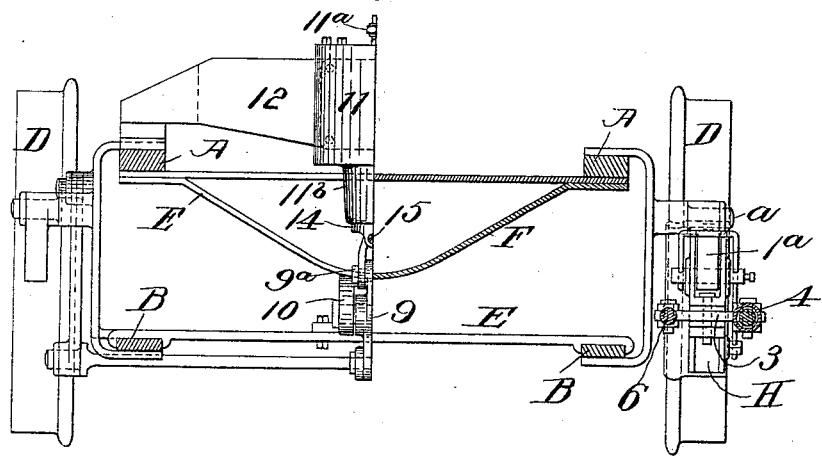
WITNESSES:
F. R. Cornwall
D. Darley
INVENTOR
Charles C. Higham
BY F. W. Ritter Jr.
ATTORNEY.

(No Model.)

4 Sheets—Sheet 4.

C. C. HIGHAM.
TRUCK BRAKE.

No. 492,923.

Patented Mar. 7, 1893.

Witnesses
F. R. Cornwall
D. Darley

Inventor
Charles C. Higham
By his Attorney
F. W. Ritter Jr.

UNITED STATES PATENT OFFICE.

CHARLES C. HIGHAM, OF ST. LOUIS, MISSOURI, ASSIGNOR TO THE WESTINGHOUSE AIR BRAKE COMPANY, OF PITTSBURG, PENNSYLVANIA.

TRUCK-BRAKE.

SPECIFICATION forming part of Letters Patent No. 492,923, dated March 7, 1893.

Application filed January 4, 1893. Serial No. 457,243. (No model.)

*To all whom it may concern:*

Be it known that I, CHARLES C. HIGHAM, a citizen of the United States, residing at St. Louis, in the State of Missouri, have invented certain new and useful Improvements in Truck-Brakes; and I hereby declare the following to be a full, clear, and exact description of the same, reference being had to the accompanying drawings, in which—

Figure 1:
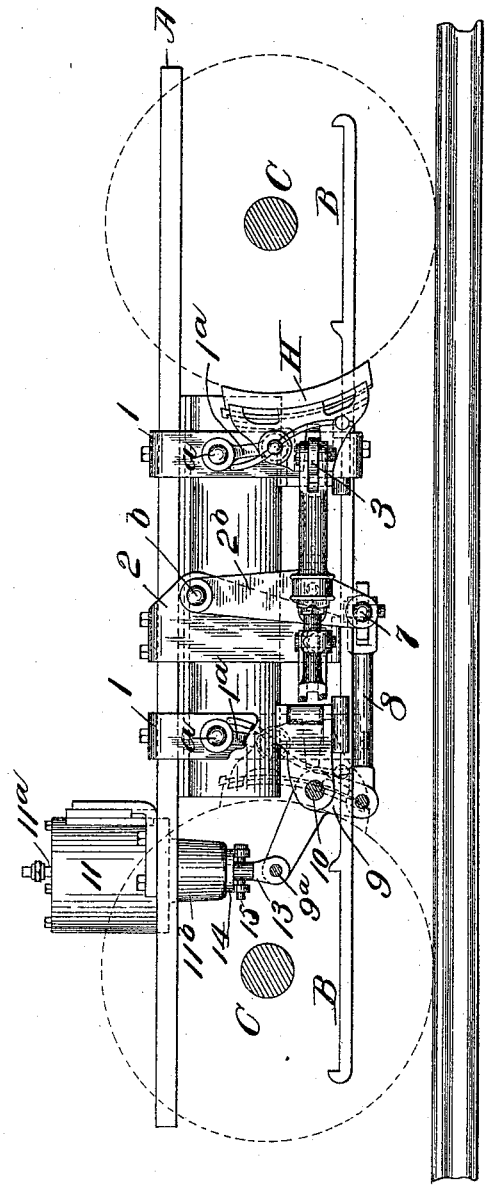
Figure 4:
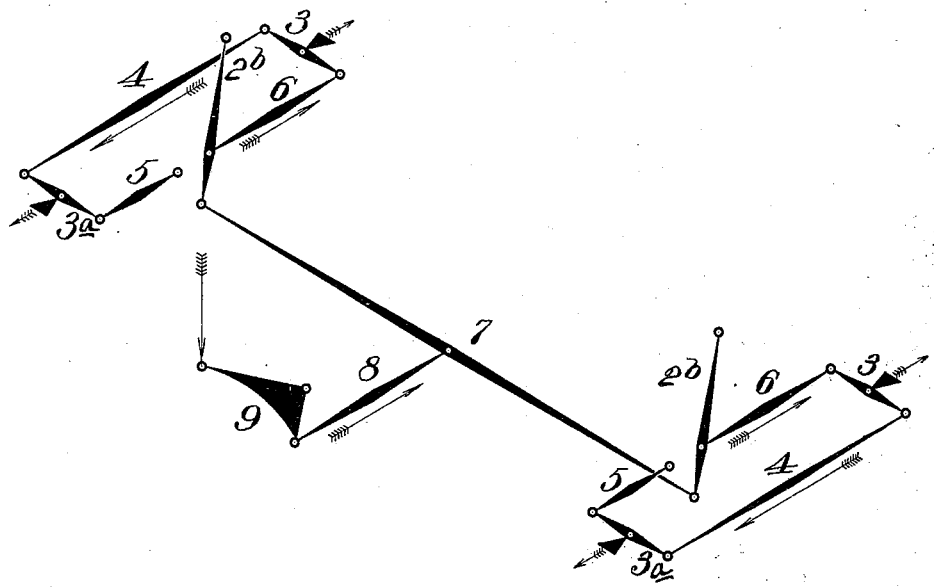
Figure 5:
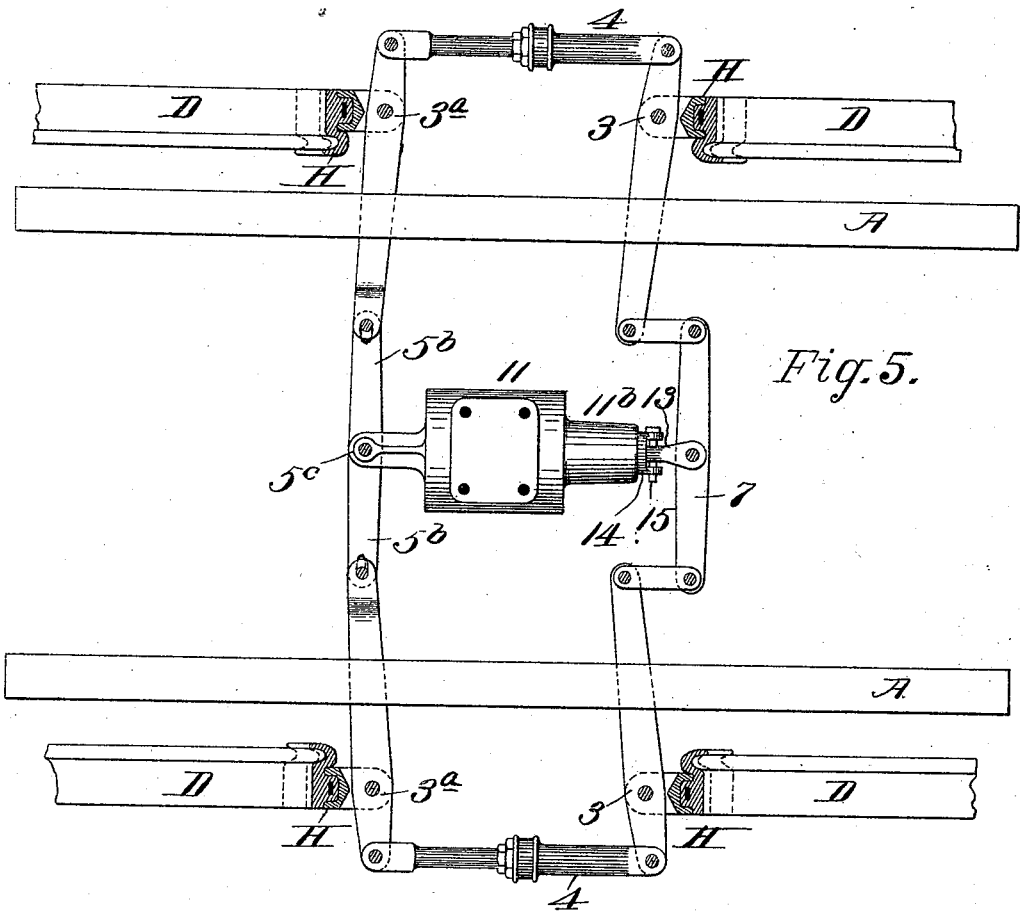

Figure 1 is a side elevation of a truck-brake system, embodying my invention; the brake head and shoe at the left of the figure having been removed, and parts of the hanger and its bracket broken away, to show more clearly the bell crank lever (its bracket) and the push bar common to the brakes of both sides. Fig. 2 is a plan view showing the twin systems, or systems of levers on both sides of the truck, and the interposed connections by means of which a simultaneous operation of both systems is obtained from a single cylinder and piston; the brake heads and hangers having been omitted for the sake of clearness. Fig. 3 is a half end elevation to the left of the vertical central line, and a half transverse vertical section to the right of the vertical central line, viewed opposite to the truck brake operating cylinder. Fig. 4 is a diagrammatic, isometric perspective showing the system of levers, and is introduced in order that the operation of the devices may more clearly appear. Fig. 5, is a plan of a modified and simplified form of the gear, which may be adopted where the construction of the truck permits of more than a single transverse operative connection between the lever systems of the opposite sides of the truck.

Like symbols refer to like parts wherever they occur.

My invention relates generally to truck-brakes and while more especially devised for use on the locomotive trucks—and in such locations where it is desirable to mount the operating cylinder on the truck—it embodies features generally applicable to truck brakes and therefore I do not herein intend to impose any limitation on the application of the system.

Generally stated, the invention embraces the combination of two lever systems, one for each side of the truck, each of said systems embracing a floating lever, a dead lever, and a connecting rod, with intermediary means for causing the simultaneous operation of the twin systems.

There are other minor features of invention, all as will hereinafter more fully appear.

For the purpose of this description, only so much of the truck &c. has been shown as will suffice to illustrate the attachment of the brake system thereto.

I will now proceed to describe my invention more fully so that others skilled in the art to which it appertains may apply the same.

In the drawings A, A indicate the upper rails or frame bars of the truck; B, B the pedestal tie bars; C, C the truck wheel axles; D, D, D, D, the truck wheels; E, E cross ties for steadying the pedestal tie bars; F, F trussed plates, or center castings (according to the general construction adopted) and G, G (shown only in Fig. 2) truck wheel equalizer yokes or beams—all of which may be of the general character shown, or any other approved design, as the same embodies no feature of the present invention, being as before specified, simply selected for the purposes of this specification.

1, 1, and 2 (see Fig. 1) indicate plate brackets properly secured above to the frame bar A and below to the pedestal tie bar B, and forming points of support $a$ and $b$ for the brake head hangers $1^a$ and the intermediate hanger $2^b$ which latter suspends the connecting and operating bar of the twin systems. From the hangers $1^a$ are suspended in the usual or any approved manner, the brake heads H, (only one of which is shown—to the right of Fig. 1) and said brake heads are preferably each formed with a slotted jaw wherein are pivoted the levers 3 and $3^a$. The levers 3, $3^a$ of the same side are connected by an adjustable connecting rod 4 preferably of the well known threaded sleeve pattern, while the end of lever $3^a$ is anchored through a link 5 on a lug $5^a$; and the end of the floating lever 3 is connected by a push rod 6 with the intermediate operating mechanism by means of which the two systems are simultaneously operated.

Thus far the description given has been that of one side or system only (as shown in elevation Fig. 1, or as appears at one side of the diagram Fig. 4)—but it is to be understood that two such systems are employed one for each side of the truck, and each system suspended between the wheels of its respective side. The systems of the opposite sides are connected by an intermediate operating bar 7 extending transversely across the truck and having its ends connected with the suspension hangers $2^b$ of the opposite sides.

About midway between the two systems a push bar 8 is pivoted or otherwise connected to the intermediate operating bar 7 as at $8^a$ the opposite end of said push bar 8 being pivotally connected with one arm of a bell crank lever 9, said bell crank lever pivoted on a fulcrum bracket 10 which may be firmly bolted to cross tie bar E and trussed plates F, F, or to any suitable fixed point on the truck structure.

11 indicates the cylinder by which the truck brake system is operated. It is attached at the middle of a yoke 12 (see Figs. 1 and 2) which yoke is bolted to the upper frame bars A, A, or if preferred directly to the truck center-casting F if the construction of the same is convenient and desirable for the purpose. This cylinder 11 is preferably of what is known as the push-spring release pattern, in which the piston receives pressure on one side through a suitable port (as at $11^a$) and by means of a flexible hose which allows of the independent radial traverse of the truck; while within the lower head or bonnet $11^b$ is the usual release spring (not shown); and the cylinder push-rod 13 is pivoted to the bell crank lever 9 or directly to the intermediate operating bar 7 as the case may be.

The cylinder push rod 13 operates within a sleeve attached to the piston, the sleeve having attached at its lower end a collar 14 having lugs through which pin 15 is fitted, which pin also fits loosely in the throat or jaw at the lower end of the push-rod 13 (see Figs. 1 and 3) preventing the push rod from dropping out of the sleeve 14 while it is thus left free to move laterally to compensate for the arc movement at pin $9^a$ of bell crank lever 9. This arrangement for retaining the push rod within the sleeve without interfering with the lateral movement of the push rod is new, so far as I am aware, and I reserve it as the subject matter for another application for Letters Patent.

The push rod 6 of each system is usually formed with two sets of pin holes $6^a$ (see Fig. 2) to permit of any adjustment required to take up slack from wear or other causes, and said construction in conjunction with the adjustable connecting rod 4 will give all the adjustment required.

If desired the lug $5^a$ on bracket 2 to which the link 5 is anchored (see Fig. 2) may be extended at right angles to the bracket and serve as a safety support for the connecting rod 4.

In the modification shown in Fig. 5—permissible only where there is room beneath the truck—the dead levers are anchored or pivoted to an equalizing beam $5^b$ fulcrumed on a clevis post $5^c$ formed integral with the rear head of the cylinder, and the live levers (or floating levers 3) are connected by links directly to the intermediate operating bar 7, and the cylinder 11 is arranged horizontally to operate directly in the plane of the brake levers so that the push-rod 13 of the cylinder acts directly on the intermediate operating bar 7, and the bell crank lever 9 and push bar 8 are dispensed with.

The operation of the system is as follows— Pressure being allowed to enter brake cylinder 11 as before specified, the piston thereof and push rod 13 move out, operating bell crank lever 9, push bar 8, and intermediate operating bar 7 (see diagram Fig. 4) which simultaneously and equally actuates the two hangers $2^b$, the push rods 6, and the floating levers 3 of opposite sides forcing the first brake shoe of each side against the wheels, and said brake heads and shoes then act as fulcra. The power is then transmitted through connecting rods 4 to the dead lever $3^a$ of each side one end of which is anchored, thus applying the second shoe of each side. When the pressure in cylinder 11 is exhausted the release spring returns the piston in the usual and well known manner, and this draws back the intermediate operating bar 7 and simultaneously releases the brakes of both sides.

It is evident that the braking power is governed by the mutual relations of the various levers, the size of the cylinder, and pressure in the cylinder; and that any number of combinations of the said variable elements and conditions may be introduced without departing from the spirit and scope of my invention. It is also evident that the brake may be operated in either the straight air, or automatic system, and in connection with other brake apparatus already on the engine— or if found to be desirable it may be operated by steam with equal facility, and therefore I do not herein impose any such limitations on the invention: but—

Having thus described my invention, what I claim, and desire to secure by Letters Patent, is—

1. In a truck brake, the combination of two brake systems, one for each side of the truck, each of said systems embracing a floating lever, a dead lever, and connecting rod; and an interposed operating bar which connects the two systems, and by means of which the braking power is simultaneously applied to both systems; substantially as and for the purposes specified.

2. In a truck brake, the combination of two systems, one for each side of the truck, each system composed of one live lever and one dead lever one of which is anchored at one end, an interposed connecting rod, and a push rod; and an interposed operating bar suspended by hangers to which the push bars of the respective systems are connected; substantially as and for the purposes specified.

3. In a truck brake, the combination of levers 3, 3ª one of which is a floating lever and the other anchored, an adjustable connecting rod 4, and an adjustable push-rod 6; substantially as and for the purposes specified.

4. In a truck brake, the combination of levers 3, 3ª one of which is a floating lever and the other anchored, a connecting rod 4, a push rod 6, and an anchor lug $5^a$ which extends beneath and forms a safety support for the connecting rod 4; substantially as and for the purposes specified.

In testimony whereof I affix my signature, in presence of two witnesses, this 30th day of December, 1892.

CHARLES C. HIGHAM.

Witnesses:
   JNO. R. WILLIAMS,
   C. C. ZIEGLER.